United States Patent
Kwon et al.

(10) Patent No.: US 9,808,988 B2
(45) Date of Patent: *Nov. 7, 2017

(54) CARBON FIBER REINFORCED PLASTIC (CFRP) STRINGER TERMINATION SOFTENING WITH STACKED CFRP NOODLE

(71) Applicant: The Boeing Company, Chicago, IL (US)

(72) Inventors: Hyukbong Kwon, Mukilteo, WA (US); Douglas A. Frisch, Renton, WA (US); Arman Rowhani, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/954,960

(22) Filed: Nov. 30, 2015

(65) Prior Publication Data

US 2017/0151709 A1    Jun. 1, 2017

(51) Int. Cl.
*B32B 5/12*    (2006.01)
*B29C 65/48*    (2006.01)
(Continued)

(52) U.S. Cl.
CPC .......... *B29C 65/488* (2013.01); *B29C 66/022* (2013.01); *B29C 66/10* (2013.01);
(Continued)

(58) Field of Classification Search
CPC ..... Y10T 428/24174; Y10T 428/24124; B32B 5/12
See application file for complete search history.

(56) References Cited

U.S. PATENT DOCUMENTS 6,562,436 B2    5/2003    George et al.
8,684,311 B2 *   4/2014    Nordman .................. B64C 1/26
                                                              244/131

(Continued)

FOREIGN PATENT DOCUMENTS

EP    2727711 A1    5/2014
EP    2871050 A1    5/2015

OTHER PUBLICATIONS

Search Report for related European Application No. EP16190942.9; report dated Apr. 5, 2017.

*Primary Examiner* — Alexander Thomas
(74) *Attorney, Agent, or Firm* — Miller, Matthias & Hull LLP

(57) ABSTRACT

A stringer and corresponding method is provided having a runout design that softens the stringer. According to one aspect, the stringer includes a base flange, a web, and a noodle. The noodle includes a unidirectional fiber top portion and a stacked laminate bottom portion coupled to the top portion. The bottom portion includes a number of stacks, each stack including three plies having three corresponding fiber orientations within an acreage region of the stringer. In a transition region of the stringer, the stacked laminate bottom portion includes a number of stacks, each stack including the first and third plies of the acreage region. According to another aspect, the base flange is softened by dropping plies within the transition region. Yet another aspect includes trimming the web down to the noodle, while trimming through the noodle according to a trim radius to a height proximate the base flange.

20 Claims, 6 Drawing Sheets

(51) Int. Cl.
    *B29C 65/00*     (2006.01)
    *B32B 5/06*     (2006.01)
    *B29L 31/30*     (2006.01)
    *B29L 9/00*     (2006.01)

(52) U.S. Cl.
    CPC ............ *B32B 5/06* (2013.01); *B29L 2009/00* (2013.01); *B29L 2031/3076* (2013.01); *B32B 2605/18* (2013.01)

(56) References Cited

U.S. PATENT DOCUMENTS

| | | | |
|---|---|---|---|
| 9,327,470 B1* | 5/2016 | Krajca | B29D 99/0014 |
| 2012/0100343 A1* | 4/2012 | Borghini-Lilli | B29C 70/30 |
| | | | 428/156 |
| 2012/0292446 A1 | 11/2012 | Kamaraj et al. | |
| 2013/0287995 A1 | 10/2013 | Deobald et al. | |

* cited by examiner

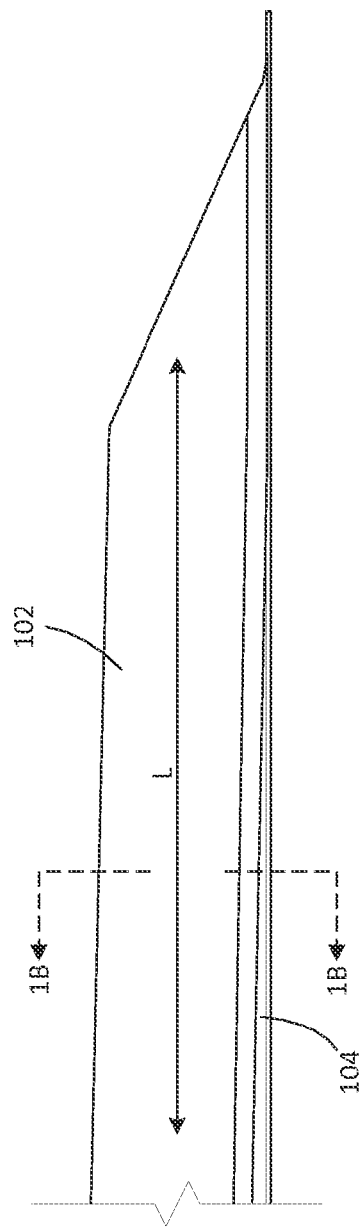
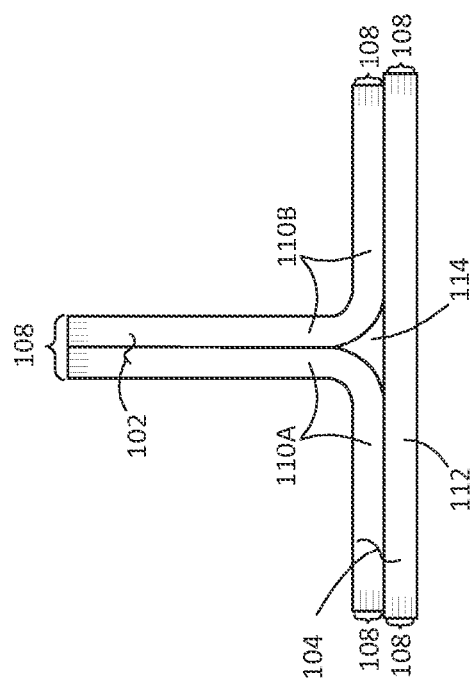

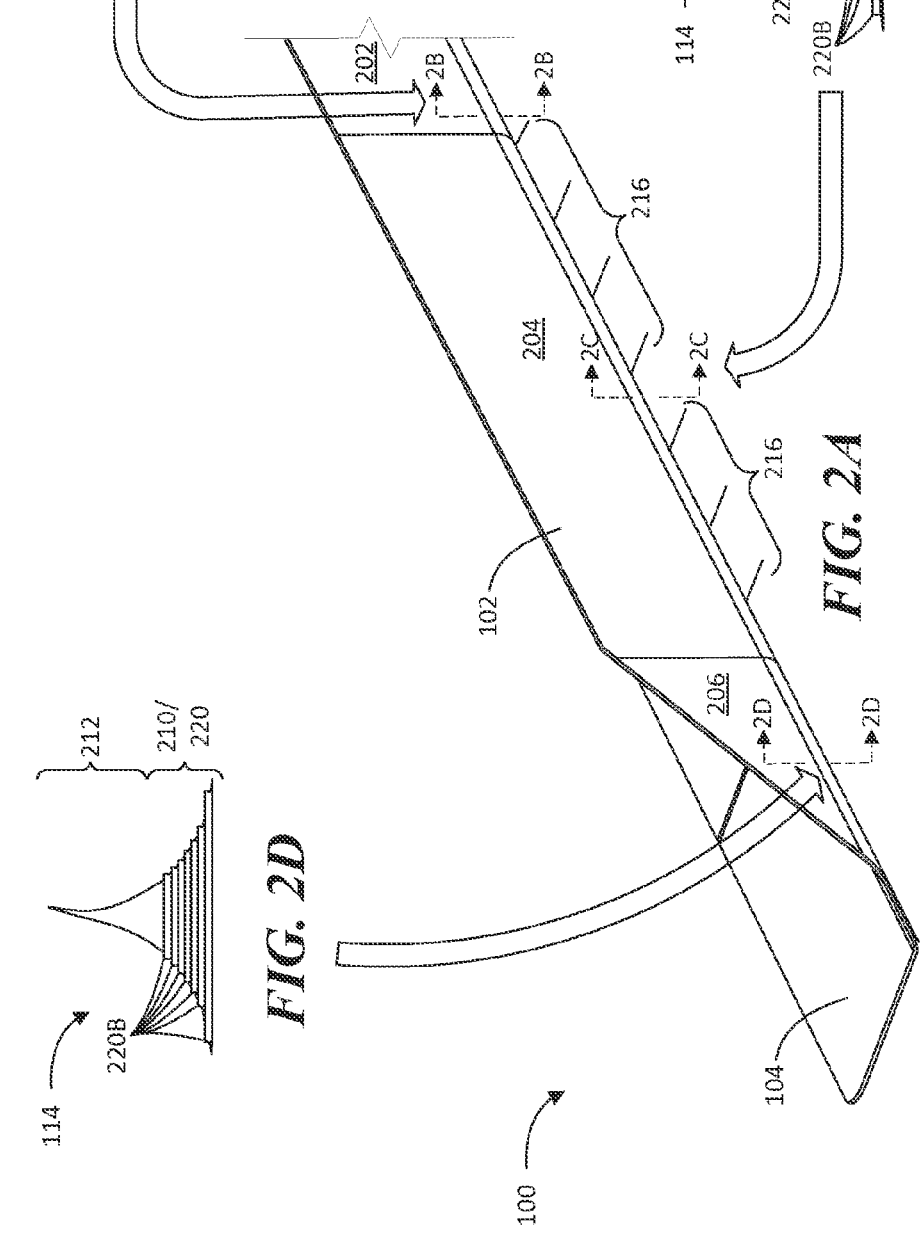

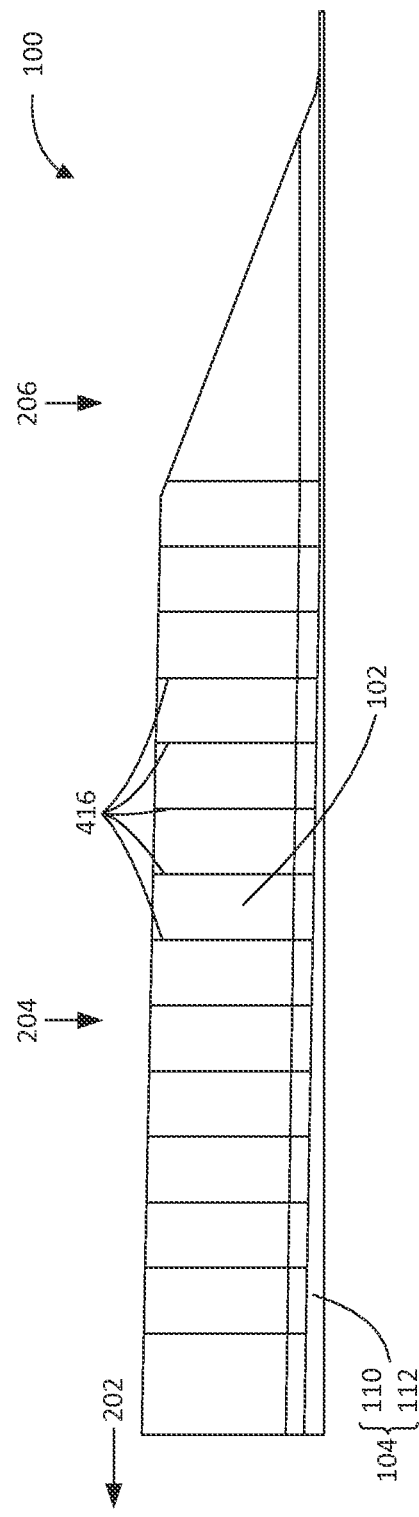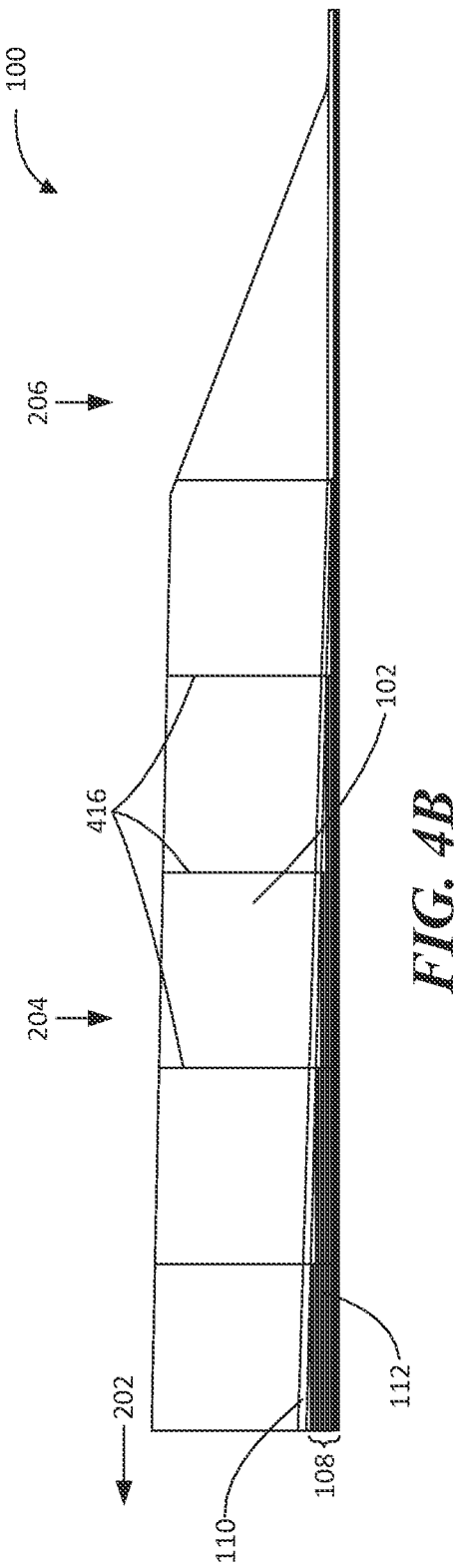

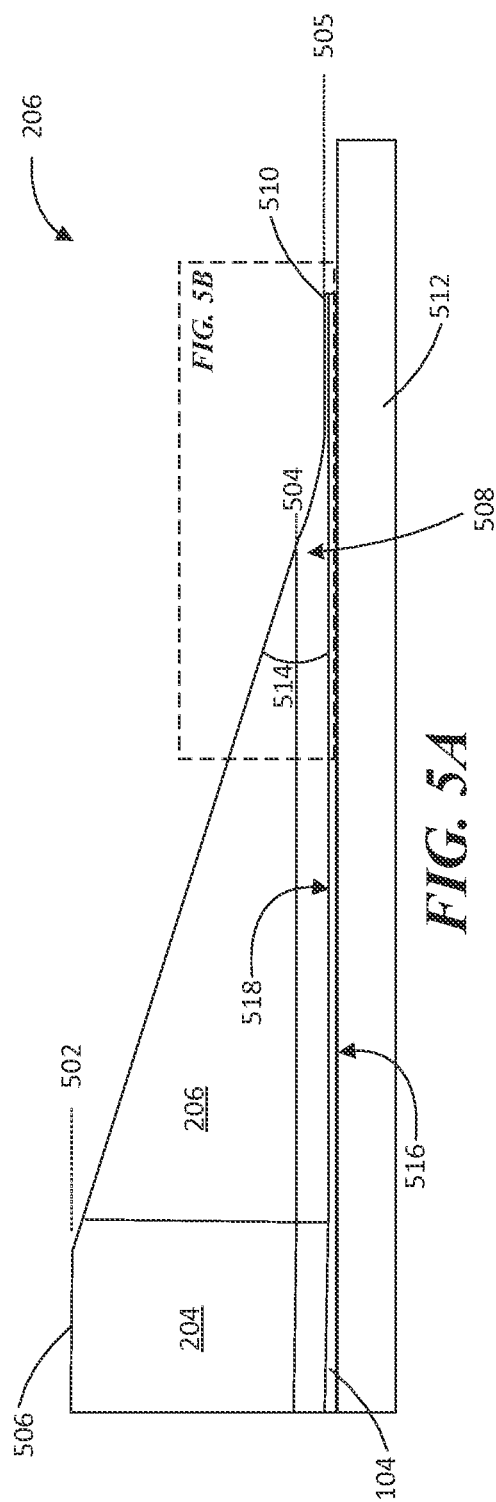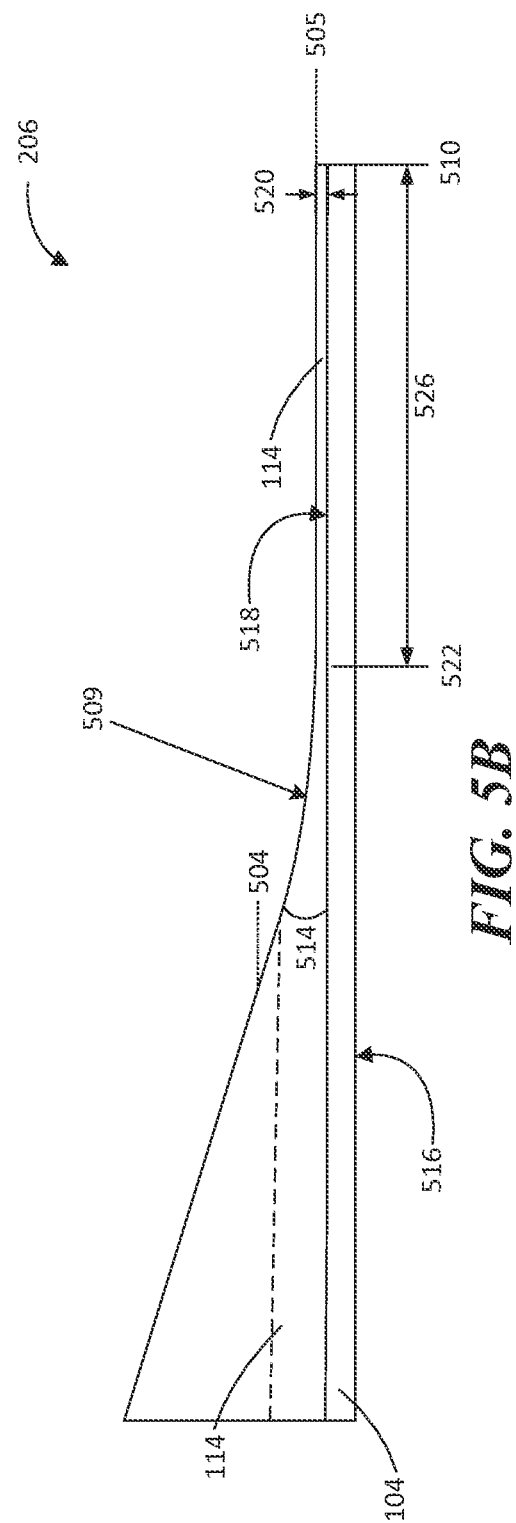

CARBON FIBER REINFORCED PLASTIC (CFRP) STRINGER TERMINATION SOFTENING WITH STACKED CFRP NOODLE

BACKGROUND

Stringers are structural components that are often used in aircraft and other vehicles to stiffen panels and vehicle skin. While stringers provide adequate reinforcement of the corresponding composite structure with respect to in-plane loads, the stringer runouts, or areas at which the stringers terminate, may experience disbonding or delamination between the stringers and the attached structure under certain conditions. The sudden discontinuity of the load path at the stringer runout location, which may be exposed to high-tension loads, may lead to bondline delamination growth driven by both geometric eccentricities and stringer pull-off forces to the stringer or attached structure.

Conventional solutions that address the load discontinuity with stringer runouts include complex web trim curvatures to decrease the cross-sectional area of the stringer, coupled with the use of radius fillers to mitigate the potential for delamination damage growth. These solutions are typically designed specifically for the loads experienced according to the particular implementation for which the stringer will be utilized. Accordingly, a specific aircraft may utilize numerous stringer designs, which increases part numbers and associated costs.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Concepts and technologies described herein provide for a stringer having a runout design that softens the stringer, and corresponding method to provide the same. According to one aspect, a stringer has a longitudinal length defining an acreage region, a transition region, and a runout region. The stringer includes a base flange, a web, and a noodle. The base flange has a bottom surface for coupling to a vehicle skin. The web extends away from the base flange and includes a bottom adjacent to the base flange and a top edge opposite the bottom. The noodle has a noodle length corresponding to the longitudinal length of the stringer and is configured to fill a stringer cavity defined between the base flange and the web. The noodle includes a unidirectional fiber top portion and a stacked laminate bottom portion coupled to the top portion. The stacked laminate bottom portion includes a number of stacks. Each stack within the acreage region has a first ply with a first orientation, a second ply abutting the first ply and having a second orientation, and a third ply abutting the second ply and having a third ply orientation. Within the transition region, the first ply having the first ply orientation abuts the third ply having the third ply orientation.

According to yet another aspect, a method for controlling delamination and separation between a composite stringer and a composite structure is provided. The method includes providing a base flange, a web, and a noodle. The base flange extends a longitudinal length through an acreage region, a transition region, and a runout region. The web extends away from the base flange and includes a bottom adjacent to the base flange and a top edge opposite the bottom. The noodle has a noodle length corresponding to the longitudinal length of the stringer and is configured to fill a stringer cavity defined between the base flange and the web. Providing the noodle includes providing a unidirectional fiber top portion and a stacked laminate bottom portion coupled to the top portion. The stacked laminate bottom portion includes a number of stacks. Providing the stacks includes abutting a first ply having a first ply orientation against a second ply having a second ply orientation, abutting the second ply against a third ply having a third ply orientation along the acreage region of the noodle length, and terminating the second ply within the transition region of the noodle length. A bottom surface of the base flange is bonded to the top surface of the composite structure.

According to another aspect, a stringer having a longitudinal length defining an acreage region, a transition region, and a runout region is provided. The stringer includes a base flange, a web, and a noodle. The base flange has a number of plies and a bottom surface for coupling to a vehicle skin. The number of plies within the base flange decreases within the transition region. The web extends away from the base flange and includes a bottom adjacent to the base flange and a top edge opposite the bottom. The top edge of the web is trimmed from a first height in the transition region to a second height proximate to the bottom at a web termination location in the runout region. The noodle has a noodle length corresponding to the longitudinal length of the stringer and is configured to fill a stringer cavity defined between the base flange and the web. The noodle includes a unidirectional fiber top portion and a stacked laminate bottom portion coupled to the top portion. The stacked laminate bottom portion includes a number of stacks. Each stack within the acreage region has a first ply with a first orientation, a second ply abutting the second ply and having a second orientation, and a third ply abutting the second ply and having a third ply orientation. Within the transition region, the first ply having the first ply orientation abuts the third ply having the third ply orientation.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 1A is side view of a composite stringer according to various embodiments described herein;

FIG. 1B is a cross-sectional view of the composite stringer of FIG. 1A taken along line 1B-1B according to various embodiments described herein;

FIG. 2A is a perspective view of a composite stringer illustrating the various regions of the stringer and drop locations for terminating plies of a corresponding noodle according to various embodiments described herein;

FIGS. 2B-2D are cross-sectional views of the noodle associated with the composite stringer of FIG. 2A taken at locations in the acreage, transition, and runout regions according to various embodiments described herein;

FIG. 4A is a side view of a composite stringer illustrating drop locations for terminating plies of a base flange according to various embodiments described herein;

FIG. 4B is a side view of the composite stringer of FIG. 4A with an exaggerated view of the plies of the base flange according to various embodiments described herein;

FIG. 5A is a side view of a termination end of a composite stringer showing details of various web trim aspects according to various embodiments described herein;

FIG. 5B is an enlarged view of a portion of the runout region of the composite stringer of FIG. 5A according to various embodiments described herein.

DETAILED DESCRIPTION

Figure 3A:
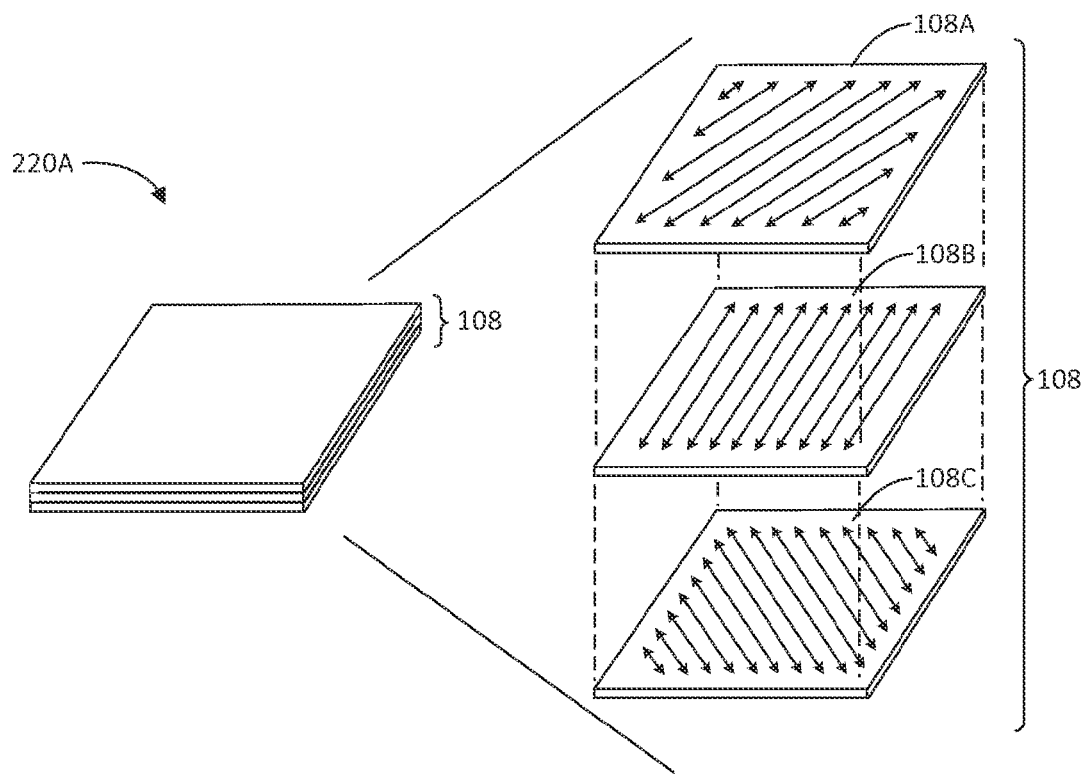
FIG. 3A shows a perspective and corresponding exploded view of an A-type stack having three plies with three corresponding different orientations according to various embodiments described herein.

The following detailed description is directed to stringers having softening characteristics at a termination end, and a corresponding method for providing the same. As discussed above, stringer termination ends, or runouts, are designed to satisfy various objectives, including managing skin to stringer delamination, minimizing stringer and noodle pull-off damage below a design limit load, and to prevent strength failure with skin to stringer delamination below design ultimate loads. Conventional solutions rely in part on cross-sectional area reduction of the stringers, as well as utilizing various stringer runout characteristics unique to the specific implementation parameters. In other words, typical stringer applications may include numerous stringer runout shapes and designs utilized within a single aircraft according to the targeted design parameters at each runout location. Additionally, conventional stringer runout applications often utilize perimeter clamp radius fillers to mitigate the risk of extended damage by clamping down the stringer radius on an external surface of the stringer where the web transitions to the base flange. It should be noted that these clamp radius fillers are external to the web and base flange of conventional stringers and differ from the noodles described herein that occupy the space between the stringer and the vehicle skin or panel to which the stringer is attached, the space being defined by the stringer web, opposing base flanges, and the skin or panel or base stringer material.

Because conventional aircraft often utilize multiple stringer runout shapes and designs, as well as utilizing external radius fillers to clamp down on the stringer, the number of parts and associated assembly time and cost can be excessive. However utilizing the concepts and technologies described herein, a stringer is provided having a runout design that softens the stringer to mitigate or prevent delamination and provide increased pull-off capability as compared to existing solutions, while doing so with a common, robust design for all stringer runout locations. The various embodiments discussed herein results in a reduced number of parts and corresponding assembly time and costs.

In the following detailed description, references are made to the accompanying drawings that form a part hereof, and which are shown by way of illustration, specific embodiments, or examples. Referring now to the drawings, in which like numerals represent like elements through the several figures, a stringer runout and method for providing the same according to the various embodiments will be described.

FIG. 1A shows a side view of a composite stringer, or stringer 100, according to various embodiments described herein. FIG. 1B shows a cross-sectional view of the stringer 100 taken along line 1B-1B in FIG. 1A. The stringer 100 includes a web 102 and a base flange 104. As seen in FIG. 1B, the stringer 100 may include two angle charges 110A and 110B (generally and collectively referred to as 110). The vertical portions of the angle charges 110 are bonded, co-cured, or otherwise joined together to create the web 102, while the base flange 104 is created by joining the horizontal portions extending from the angle charges 110 to a base charge 112 or vehicle skin with a filler, or noodle 114, in between. The angle charges 110 and base charge 112 are created with a number of layers or plies 108 of composite material. According to various embodiments discussed below, the number of plies 108 is not constant along a longitudinal length L of the stringer 100. The base flange 104 characteristics according to various embodiments will be described in detail below with respect to FIGS. 4A and 4B. Similarly, the noodle 114 is created with a noodle length that corresponds with the longitudinal length L of the stringer, but with a number of plies 108 that does not remain constant along the noodle length.

Turning now to FIGS. 2A-2D, characteristics of a stringer 100 termination, as well as characteristics of the noodle 114, will be discussed according to various embodiments. FIG. 2A shows a partial perspective view of a stringer 100 with one horizontal portion of the base flange 104 removed for illustrative purposes. The stringer 100 includes an acreage region 202, a transition region 204, and a runout region 206. These portions are separated by vertical lines in the drawings, which are depicted for clarity purposes only. In practice, the portions of the stringer 100 are not physically separated in a visible manner.

The acreage region 202 includes the longitudinal length of the stringer 100 in which the components of the stringer 100 have a maximum and constant number of plies 108. The runout region 206 includes the longitudinal length of the stringer 100 in which the stringer 100 terminates. Components of the stringer 100 within the runout region 206 will include the fewest number of plies 108 at termination according to embodiments described herein. The transition region 204 includes a longitudinal length of the stringer 100 in which the components of the stringer 100 transition to the characteristics they will possess within the runout region 206. For example, as will be discussed in detail below, the number of plies 108 within the base flange 104 and the noodle 114 may decrease within the transition region 204 to the runout region 206.

The stringer 100 includes various aspects that will be described in detail below that individually and collectively provide beneficial softening characteristics that mitigates delamination and pull-off damage under operational loads. First, as will be discussed with reference to FIGS. 2A-2D, 3A, and 3B, the noodle 114 decreases in cross-sectional area from the acreage region 202 to the runout region 206 through a process of dropping specific plies 108 of the noodle 114 throughout the transition region 204 of the stringer 100. Second, as will be discussed below with reference to FIGS. 4A and 4B, according to various embodiments, the base flange 104 is softened from the acreage region 202 to the runout region 206 through a process of dropping specific plies 108 of the base flange 104 throughout the transition region 204 of the stringer 100. Additionally, as will be discussed below with reference to FIGS. 5A and 5B, according to various embodiments, the web 102 is trimmed in a particular manner in the runout region 206 that effectively decouples a pull-off load interaction with bondline damage growth between the stringer 100 and the skin to which the stringer 100 is attached. For the purposes of this disclosure, the term "softening" means reducing the stringer 100 cross-sectional area and modulus of elasticity.

FIG. 2B shows a cross-section of a noodle 114 taken along line 2B-2B in the acreage region 202 of the stringer 100. According to various embodiments, the noodle 114 may include a noodle base 210 and a noodle tip 212. The noodle base 210, or stacked laminate bottom portion of the noodle 114, is created by layering composite plies 108 into stacks 220. The stacks 220 are then layered one on top of the other to create the noodle base 210. The stacks are created or trimmed to an appropriate width to create the desired outer noodle surface 214 shape and contour, which corresponds to the stringer cavity created between the web 102 and base charge 112 or vehicle skin.

On top of the noodle base 210 is the noodle tip 212. According to one embodiment, the noodle tip 212 is a unidirectional fiber top portion of the noodle 114 that is created from a rolled sheet of unidirectional fibers and is placed on the top of the noodle base 210. The disclosure herein is not limited to a rolled configuration of unidirectional fibers. Rather, the noodle tip 212 may include layers of stacks similar to the noodle base 210, unidirectional fibers pulled through a die, or other suitable tip configurations. According to one embodiment, the noodle tip 212 remains constant or substantially uniform in cross-sectional area throughout not only the acreage region 202, but also throughout the transition region 204 of the stringer 100. In contrast, according to various embodiments described below, the gauge of the noodle base 210 of the stringer 100 is reduced throughout the transition region 204 via terminating plies 108 from the stacks 220. By reducing the gauge of the noodle base 210, the cross-sectional area of the stringer cavity decreases from the acreage region 202 to the runout region 206. According to alternative embodiments, the noodle tip 212 may have a variable cross-sectional area through the transition region 204 along with or in place of reducing the gauge of the noodle base 210.

Turning now to FIG. 3A, one example of a stack 220 within the noodle base 210 of the stringer 100 in the acreage region 202 will be described. In this example, an A-type stack 220A of layered composite plies 108 includes three plies. Each ply 108 includes unidirectional fibers oriented in a specific direction. A first ply 108A has a first ply orientation, a second ply 108B has a second ply orientation, and a third ply 108C has a third ply orientation. According to this embodiment, the second ply 108B has fibers oriented in a 0 degree direction and is positioned between the first ply 108A and the third ply 108C, which are offset +/−30 degrees from the second ply 108B. In other words, the first ply 108A is oriented at 30 degrees with respect to the second ply 108B, and abuts the second ply 108B. The third ply 108C is oriented at −30 degrees with respect to the second ply 108B, or 60 degrees offset from the first ply 108A, and abuts the second ply 108B.

According to one embodiment, the offset degrees of 30/0/−30 are selected to provide a stiffness of the noodle 114 that substantially corresponds with the stiffness of the stringer 100 in the acreage region 202. It should be appreciated that this disclosure is not limited to the specific 30/0/−30 offset degrees discussed with respect to the A-type stack of this example. For example, according to other embodiments, offset ranges between +/−10 to +/−50 degrees may be chosen for the first ply 108A and the third ply 108C.

In the example shown in FIG. 2B, the noodle 114 in the acreage region 202 has a noodle base 210 created by layering eight A-type stacks 220A. As discussed above, the noodle tip 212 and the noodle base 210 remain constant throughout the acreage region 202 of the stringer 100 such that the cross-sectional area of the noodle 114 within the acreage region 202 remains substantially constant. It should be noted that this disclosure is not limited to eight or any particular number of stacks 220 in the noodle base 210.

Looking now at the cross-sectional view of the noodle 114 taken along line 2C-2C in the transition region 204 of the stringer 100, as shown in FIG. 2C, the noodle 114 characteristics at an approximate midpoint location of the transition region 204 will be described. According to various embodiments, the noodle 114 is softened in the transition region 204, reducing the cross-sectional area of the noodle 114 progressively along the longitudinal length of the noodle 114 from the acreage region 202 to the runout region 206. To do so, embodiments vary the type and arrangement of the stacks 220 in the noodle base 210 throughout the transition region 204 while leaving the noodle tip 212 substantially intact and constant.

Figure 3B:
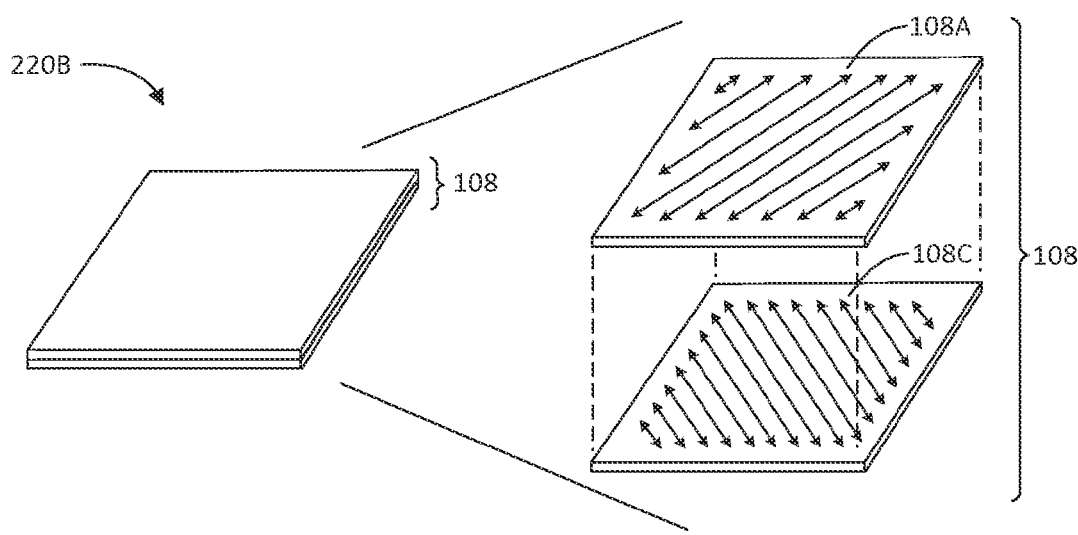
FIG. 3B shows a perspective and corresponding exploded view of a B-type stack having two plies with two corresponding different orientations according to various embodiments described herein.

FIG. 3B shows a second type of stack 220, a B-type stack 220B, according to various embodiments. While the A-type stack 220A included three plies having a 0 degree second ply 108B positioned between two offset plies, plies 108A and 108C, the B-type stack 220B includes two plies, the first ply 108A and the third ply 108C. The 0 degree second ply 108B has been removed or omitted from the B-type stack 220B. In doing so, the B-type stack 220B includes the first ply 108A and the third ply 108C directly abutting one another and oriented with the unidirectional fibers of the plies offset by a defined amount. According to the example above in which the A-type stack 220A included a 30/0/−30 orientation, the B-type stack 220B may include a 30/−30 orientation. Because the B-type stack 220B includes fewer plies than the A-type stack 220A, the B-type stack has a smaller thickness or gauge. In addition to removing plies from a stack, the number of stacks may also be decreased to reduce the noodle cross-sectional area where desired. The resulting noodle 114 characteristics within the transition region 204 includes a decreased noodle cross-sectional area and modulus as compared to the noodle 114 in the acreage region 202, resulting in a decreased stiffness within the noodle 114 in the transition region 204.

Returning to FIGS. 2A and 2C, the cross-sectional view of the noodle 114 is taken at approximately a midpoint location of the transition region 204. Accordingly, the noodle base 210 shown in FIG. 2C includes four A-type stacks 220A on top of four B-type stacks 220B. Within the transition region 204, according to various embodiments, a 0 degree ply is dropped at appropriately spaced drop locations 216 along the longitudinal length of the noodle 114 in a direction from the acreage region 202 towards the runout region 206. The term "dropped" means that an A-type stack 220A having three plies 108 becomes a B-type stack 220B having two plies 108. Essentially, the 0 degree ply, or any other ply being dropped, is terminated. The drop locations 216 are depicted as solid lines along the transition region 204 of FIG. 2A for illustrative purposes. The drop location 216 may be evenly spaced across the transition region 204 according to the desired number of plies 108 being dropped throughout the transition region 204. Alternatively, the drop location 216 may be unevenly spaced according to a desired stiffness characteristic of the stringer 100.

Looking now at the cross-sectional view of the noodle 114 taken along line 2D-2D in the runout region 206 of the stringer 100, as shown in FIG. 2D, the noodle 114 characteristics within the runout region 206 will be described. According to various embodiments, the noodle 114 is softened in the transition region 204 according to the process described above, resulting in a noodle 114 in the runout region 206 that has a minimal cross-sectional area until trimmed with the web as discussed in greater detail below. As seen in FIG. 2D, the stacks 220 of the noodle base 210 are all B-type stacks 220B. In addition, one or more stacks 220 may be entirely dropped. As an example, the noodle base 210 of FIG. 2D includes seven stacks 220, illustrating how not only were all of the A-type stacks 220A of the noodle 114 in the acreage region 202 replaced with B-type stacks 220B prior to the runout region 206, one stack 220 was dropped altogether to reduce the total number of stacks 220 from eight to seven from the acreage region 202 to the runout region 206.

Turning to FIGS. 4A and 4B, the softening of the base charge 112 of the base flange 104 from the acreage region 202 to the runout region 206 will be discussed. In addition to softening the noodle 114, another way in which the modulus of elasticity is decreased at the termination end of a stringer 100 in order to control delamination is to reduce the thickness or gauge of the base flange 104 along the longitudinal length of the stringer 100 from the acreage region 202, through the transition region 204, to the runout region 206. FIG. 4A shows a side view of a stringer 100 having a base flange 104 that decreases in gauge from the acreage region 202 to the runout region 206. This thinning of the base flange 104 occurs via dropping or terminating plies 108 in the base charge 112 of the base flange 104 at predetermined base ply drop locations 416 along the longitudinal length of the stringer 100, primarily in the transition region 204.

FIG. 4B is a side view of a stringer 100 similar to that shown in FIG. 3B, however, the thickness and detail of the base charge 112 has been exaggerated for illustrative purposes. As shown and discussed, the base charge 112 is made of layers of plies 108. Conventional stringers have a base charge that is uniform in thickness, and equivalent to the web charge thickness, along the longitudinal length of the stringer, even at the termination end. In contrast, as best illustrated in FIG. 4B, the stringer 100 includes a base charge 112 that sequentially terminates plies 108 from the top layer down at base ply drop locations 416 throughout the transition region 204. These base ply drop location 416 are depicted as vertical lines along the web 102 of the stringer 100 for clarity purposes. The base ply drop locations 416 may be evenly spaced across the transition region 204 according to the desired number of plies 108 being dropped throughout the transition region 204. Alternatively, the base ply drop location 416 may be unevenly spaced according to a desired stiffness characteristic of the base flange 104.

According to one example implementation, the base charge 112 in the base flange 104 may be approximately 25 plies thick in the acreage region 202, and drops to one ply in the runout region 206. By reducing the base charge 112 to one ply, the center of gravity (CG) at the termination end of the stringer 100 is reduced and the modulus of elasticity is substantially decreased. Doing so reduces the risk of delamination since the lower CG and elastic modulus decreases the moment from a load that may result in delamination in a traditional stringer with no base charge softening. It should be understood that according to various embodiments, the angle charges 110A and 110B may also be softened through the transition region 204 by dropping plies 108. These plies 108 may be dropped at the base ply drop locations 416, or at other drop locations selected according to the particular implementation and desired stringer 100 characteristics. Dropping plies 108 in the angle charges 110 would further reduce the gauge of the base flange 104, as well as the gauge of the web 102.

Turning now to FIGS. 5A and 5B, details of the web 102 trimming according to various embodiments will be discussed. As previously stated, in addition to softening the noodle 114 and the base flange 104, concepts described herein provide for trimming the web 102 in order to decouple the pull-off load interaction with bondline damage growth. FIG. 5A shows a stringer 100 attached to a composite structure 512 such as a vehicle skin or panel. The web 102 of the stringer 100 is trimmed within the runout region 206. According to this embodiment, a top edge 506 of the web 102 is trimmed linearly from a first height 502 at the top edge 506 at a first height location in the transition region 204 to a second height 504 proximate to a bottom 508 of the web 102 at a stringer termination location 510 in the runout region 206. Although trimming the web 102 linearly from the first height 502 to the second height 504 simplifies manufacturing, it should be appreciated that any design configuration of the top edge 506 of the web 102 that reduces the height from the first height 502 to the second height 504 may be used, including curved trim configurations. The bottom 508 of the web 102 may be a location that substantially coincides with a tip of the noodle 114. The web trim allows the shear loads at the stringer termination end to be transferred from the web 102 to the vehicle skin to which the stringer 100 is bonded. The web trim gradually decreases the CG, reducing the load moments that could result in stringer pull-off and bondline damage growth.

The web 102 is trimmed according to a trim angle 514 measured from a line parallel to a bottom surface 516 of the base flange. The trim angle 514 may be between 10-50 degrees according to various embodiments. Lower trim angles 514 may be used in tension dominated loading, while higher angles can be used in compression dominated loading.

FIG. 5B shows an enlarged view of the runout region 206 defined by the broken box in FIG. 5A. According to various embodiments, the web 102 is trimmed according to a curve having a trim radius 509. The trim radius 509 is large enough to provide a shallow turn through the noodle 114, minimizing noodle stress and reducing stringer laminate strains along the web trim. The web 102 is trimmed through the noodle 114 from the second height 504 to a third height 505 that is proximate to the top surface 518 of the base flange 104 at minimal trim location 522. The noodle 114 continues at the third height 505 towards the stringer termination location 510 a distance 526 before terminating. The third height 505 is adjacent to the top surface 518 of the base flange 104 so as to provide a minimal protrusion above the base flange 104. The third height 505 may ideally be flush with the top surface 518 of the base flange 104, however, due to practical limitations with manufacturing tolerances, the third height 505 may not be identical to the height of the top surface 518 of the base flange 104.

By minimizing the third height 505 for a distance 526, there is minimal web area at the termination end of the stringer 100. By essentially eliminating, or at least minimizing, the web area at the stringer 100 runout, the stringer 100 is resistant to pull-off loading in that area as there is no or minimal material to receive the load. If any damage exists in the bondline at the end of the stringer 100, the stringer 100 runout described herein substantially eliminates stringer pull-off loads that would conventionally allow the stringer 100 to pull away from the vehicle skin due to the higher CG and resulting moments existing in conventional stringer runouts. As a result, the stringer is effectively decoupled from the bondline damage, preventing growth of the damage that would traditionally occur with conventional stringer runouts. Distance 526 may vary according to the particular application, but should be of sufficient length to prevent pull-off loads from interacting with any vehicle skin delamination at the stringer termination location 510.

According to one illustrative example, the web 102 is trimmed at a trim angle 514 of approximately 20 degrees. The web 102 is trimmed through the noodle 114 according to a two-inch trim radius 509 to a third height of approximately 0.050 inches for a distance of approximately 1 inch before terminating at the stringer termination location 510. It should be appreciated that this example is for illustration purposes only and is not intended to limit this disclosure in any way. Rather, the precise values of the various characteristics of the stringer 100 described herein may be selected according to the particular vehicle application and corresponding design loads.

Figure 6:
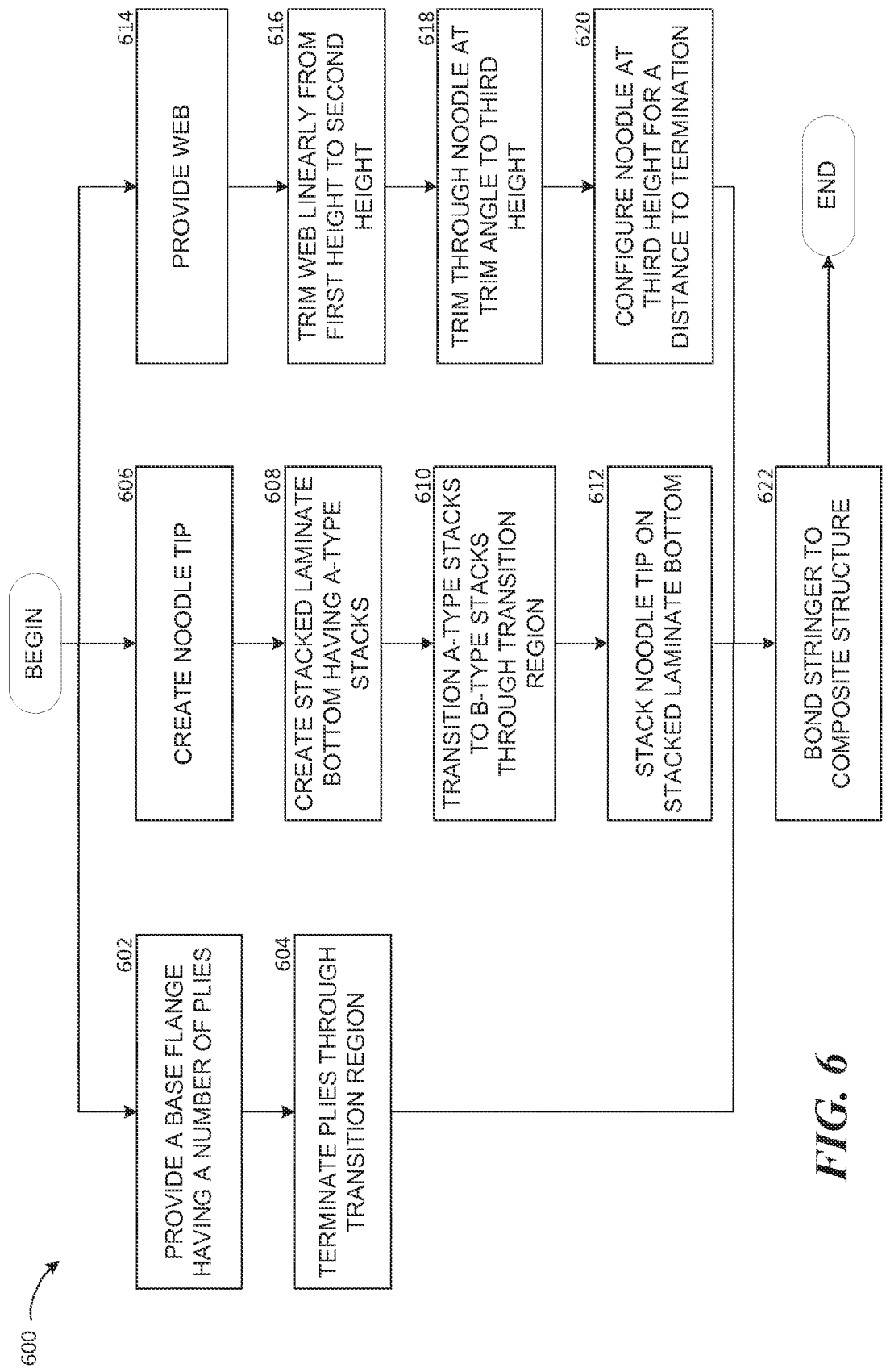
FIG. 6 is a flow diagram showing a method for controlling delamination and separation between a composite stringer and a composite structure according to various embodiments described herein.

FIG. 6 shows a routine 600 for controlling delamination and separation between a composite stringer and a composite structure according to various embodiments presented herein. It should be appreciated that more or fewer operations may be performed than shown in the figures and described herein. These operations may also be performed in parallel, or in a different order than those described herein.

The various embodiments discussed above encompass a stringer 100 having runout characteristics that decrease the modulus of elasticity and provide increased resistance to delamination, stringer pull-off damage, and bondline damage growth. These advantageous runout characteristics are primarily provided via three aspects of the stringer 100 at the termination end, in particular, the softening of the noodle 114 through dropping the 0 degree plies throughout the transition region 204, the thinning of the base flange 104 through dropping plies throughout the transition region 204, and the trimming of the web 102 and continued trimming through the noodle 114 according to a trim radius 509, leaving a distance of minimal noodle 114 height prior to termination. These three runout characteristics may be created in parallel or any order during creation of the stringer 100 depending on manufacturing preferences. The routine 600 shows the three characteristics being provided in parallel for clarity purposes, but the disclosure is not limited to any particular order.

The routine 600 begins at operation 602, where the base flange 104 is provided, having a number of plies 108. As discussed above, the base flange 104 includes a number of layered unidirectional fiber plies 108. These plies 108 are sequentially terminated at operation 604 at base ply drop locations 416 throughout the transition region 204. According to one embodiment, the base charge 112 is reduced to one ply 108 at the termination end of the stringer 100 in the runout region 206. From operation 604, the routine 600 continues to operation 622 and continues as described below.

Returning to operation 606, the noodle 114 production process will be described. At operation 606, the noodle tip 212 is created. According to one embodiment, the noodle tip 212 is created by rolling a sheet of unidirectional fibers to the desired size and shape corresponding to the stringer cavity within the stringer 100. From operation 606, the routine 600 continues to operation 608, where the stacked laminate bottom, or noodle base 210, is created with A-type stacks 220A. As discussed above, the A-type stacks 220A include three plies, each having a different unidirectional fiber orientation. The disclosure is not limited to three plies per stack, however. The A-type stacks 220A are transitioned to B-type stacks 220B through the transition region 204 at operation 610. This transitioning involves dropping a ply 108 from the A-type stacks 220A to create the B-type stacks 220B. According to one embodiment, the dropped plies 108 are 0 degree plies. The plies 108 are dropped at appropriately spaced drop locations 216 throughout the transition region 204. At operation 612, the noodle tip 212 is stacked on the stacked laminate bottom to complete the noodle 114, and the routine continues to operation 622 and proceeds as described below.

Returning to operation 614, the web 102 is created. This production occurs according to known processes, including utilizing layered composite plies configured according to angle charges 110 and bonding the angle charges 110 together to create the web 102. The routine 600 continues to operation 616, where the web 102 is trimmed from a first height 502 to a second height 504 proximate to the bottom 508 of the web 102 in the runout region 206. The bottom 508 may be proximate to or coincide with the tip of the noodle 114. At operation 618, the trim continues through the noodle 114 according to a curve having a trim radius 509 to a third height 505, which is a minimum height of the web. The third height 505 is proximate to the top surface 518 of the base flange 104. The routine 600 continues to operation 620, where the noodle 114 continues for a distance 526 at the third height 505 to the stringer termination location 510. From operation 620, the routine 600 continues to operation 622, where the resulting stringer 100 is bonded to the composite structure 512 and the routine 600 ends.

Based on the foregoing, it should be appreciated that technologies for providing a stringer with a softened termination end, and corresponding method, are provided herein. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A stringer having a longitudinal length defining an acreage region, a transition region, and a runout region, the stringer comprising:
   a base flange comprising a bottom surface configured for coupling to a vehicle skin;
   a web extending away from the base flange, the web comprising a bottom adjacent to the base flange and a top edge opposite the bottom; and
   a noodle having a noodle length substantially corresponding to the longitudinal length and configured to substantially fill a stringer cavity defined between the base flange and the web along the longitudinal length, the noodle comprising
   a unidirectional fiber top portion;
   a stacked laminate bottom portion coupled to the unidirectional fiber top portion, the stacked laminate bottom portion comprising a plurality of stacks, each of the plurality of stacks comprising
   a first ply having a first ply orientation, a second ply abutting the first ply and having a second ply orientation, and a third ply abutting the second ply and having a third ply orientation along the acreage region of the noodle length, and
the first ply having the first ply orientation and the third ply having the third ply orientation abutting the first ply along the transition region of the noodle length.

2. The stringer of claim 1, wherein each stack of the plurality of stacks in the stacked laminate bottom portion terminates the second ply at a location within the transition region of the stringer.

3. The stringer of claim 2, wherein the plurality of stacks consecutively terminate the second ply of each stack at a different location within the transition region of the stringer such that a noodle cross-sectional area and modulus decreases from the acreage region of the stringer to the runout region of the stringer.

4. The stringer of claim 3, wherein at a midpoint location of the transition region of the stringer, the noodle comprises the unidirectional fiber top portion having a first cross-sectional area that is substantially the same as a second cross-sectional area in the acreage region, and wherein approximately a first half of plurality of stacks comprises the first ply abutting the second ply and the second ply abutting the third ply, and wherein approximately a second half of the plurality of stacks comprises the first ply abutting the third ply.

5. The stringer of claim 1, wherein the top edge of the web is trimmed from a first height at the top edge at a first height location in the transition region to a second height proximate to the bottom in the runout region.

6. The stringer of claim 5, wherein the web is trimmed from the first height to the second height, and wherein the noodle is trimmed according to a curve having a trim radius from the second height to a third height proximate to a top surface of the base flange.

7. The stringer of claim 6, wherein the noodle continues at the third height from a minimal trim location to a stringer termination location at an end of the runout region.

8. The stringer of claim 7, wherein the base flange comprises a plurality of plies, and wherein a number of plies of the plurality of plies decreases in the transition region.

9. The stringer of claim 8, wherein the number of plies decreases to one ply.

10. The stringer of claim 1, wherein the base flange comprises a plurality of plies, and wherein a number of plies of the plurality of plies decreases in the transition region.

11. The stringer of claim 10, wherein the number of plies decreases to one ply.

12. A method of controlling delamination and separation between a composite stringer and a composite structure, the method comprising:
providing a base flange of the composite stringer, the base flange comprising a bottom surface configured for coupling to the composite structure and an acreage region, a transition region, and a runout region along a longitudinal length;
providing a web extending away from the base flange, the web comprising a bottom adjacent to the base flange and a top edge opposite the bottom, the web extending along the acreage region, the transition region, and the runout region of the longitudinal length;
providing a noodle having a noodle length substantially corresponding to the longitudinal length and configured to substantially fill a stringer cavity defined between the base flange and the web along the longitudinal length, wherein providing the noodle comprises
providing a unidirectional fiber top portion;
providing a stacked laminate bottom portion comprising a plurality of stacks, wherein providing each of the plurality of stacks comprises
abutting a first ply having a first ply orientation against a second ply having a second ply orientation,
abutting the second ply against a third ply having a third ply orientation along the acreage region of the noodle length, and
terminating the second ply within the transition region of the noodle length; and
bonding the bottom surface of the base flange to a top surface of the composite structure.

13. The method of claim 12, wherein terminating the second ply within the transition region of the noodle length comprises consecutively terminating the second ply of each stack of the plurality of stacks at a different location within the transition region of the stringer such that a noodle cross-sectional area decreases from the acreage region of the stringer to the runout region of the stringer.

14. The method of claim 13, wherein at a midpoint location of the transition region of the stringer, approximately a first half of plurality of stacks comprises the first ply abutting the second ply and the second ply abutting the third ply, and wherein approximately a second half of the plurality of stacks comprises the first ply abutting the third ply.

15. The method of claim 12, wherein providing the web comprises:
trimming the top edge of the web from a first height at the top edge at a first height location in the transition region to a second height proximate to the bottom of the web in the runout region.

16. The method of claim 15, wherein trimming the top edge of the web comprises trimming the top edge of the web linearly from the first height to the second height, and further comprising
trimming the noodle according to a curve having a trim radius from the second height to a third height proximate to the top surface of the base flange.

17. The method of claim 16, wherein providing the noodle further comprises providing the noodle such that the noodle continues at the third height from a minimal trim location to a stringer termination location at an end of the runout region.

18. The method of claim 17, wherein providing the base flange comprises providing a plurality of plies and consecutively terminating a ply of the plurality of plies at a plurality of predetermined base ply drop locations through the transition region.

19. The method of claim 18, wherein consecutively terminating a ply of the plurality of plies through the transition region occurs until one ply remains.

20. A stringer having a longitudinal length defining an acreage region, a transition region, and a runout region, the stringer comprising:
a base flange comprising a plurality of plies and a bottom surface configured for coupling to a vehicle skin, wherein a number of plies of the plurality of plies decreases in the transition region;
a web extending away from the base flange, the web comprising a bottom adjacent to the base flange and a top edge opposite the bottom, wherein the top edge of the web is trimmed from a first height at the top edge at a first height location in the transition region to a second height proximate to the bottom at a web termination location in the runout region; and a noodle having a noodle length substantially corresponding to the longitudinal length and configured to substantially fill a stringer cavity defined between the base flange and the web along the longitudinal length, the noodle comprising
- a unidirectional fiber top portion having a constant cross-sectional area throughout the acreage region and the transition region; and
- a stacked laminate bottom portion coupled to the unidirectional fiber top portion, the stacked laminate bottom portion comprising a plurality of stacks, each of the plurality of stacks comprising
  - a first ply having a first ply orientation, a second ply abutting the first ply and having a second ply orientation, and a third ply abutting the second ply and having a third ply orientation along the acreage region of the noodle length, and
  - the first ply having the first ply orientation and the third ply having the third ply orientation abutting the first ply along the transition region of the noodle length.

\* \* \* \* \*